United States Patent
Chen et al.

(10) Patent No.: US 12,474,404 B2
(45) Date of Patent: Nov. 18, 2025

(54) TEST CIRCUIT, TEST METHOD, AND COMPUTING SYSTEM COMPRISING TEST CIRCUIT FOR TESTING SEQUENTIAL CIRCUIT IN PIPELINE STAGE

(71) Applicant: SHENZHEN MICROBT ELECTRONICS TECHNOLOGY CO., LTD., Guangdong (CN)

(72) Inventors: Mo Chen, Guangdong (CN); Zhijun Fan, Guangdong (CN); Jianbo Liu, Guangdong (CN); Chao Xu, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 194 days.

(21) Appl. No.: 18/268,517

(22) PCT Filed: Jan. 6, 2022

(86) PCT No.: PCT/CN2022/070473
§ 371 (c)(1),
(2) Date: Jun. 20, 2023

(87) PCT Pub. No.: WO2022/152032
PCT Pub. Date: Jul. 21, 2022

(65) Prior Publication Data
US 2024/0036113 A1 Feb. 1, 2024

(30) Foreign Application Priority Data
Jan. 14, 2021 (CN) .......................... 202110048109.2

(51) Int. Cl.
*G01R 31/317* (2006.01)
*G11C 29/12* (2006.01)

(52) U.S. Cl.
CPC .. *G01R 31/31727* (2013.01); *G11C 29/12015* (2013.01)

(58) Field of Classification Search
CPC .......... G01R 31/31727; G01R 31/3183; G01R 31/31726; G01R 31/318392;
(Continued)

(56) References Cited

U.S. PATENT DOCUMENTS

| | | |
|---|---|---|
| 5,072,138 A | 12/1991 | Slemmer et al. |
| 5,161,159 A | 11/1992 | McClure et al. |

(Continued)

FOREIGN PATENT DOCUMENTS

| | | |
|---|---|---|
| CN | 1849518 A | 10/2006 |
| CN | 101389970 A | 3/2009 |

(Continued)

OTHER PUBLICATIONS

First Office Action of the corresponding TW application 111100571 (12 pages including English Translation).

(Continued)

*Primary Examiner* — Cynthia Britt
(74) *Attorney, Agent, or Firm* — Merchant & Gould P.C.

(57) ABSTRACT

A test circuit (300, 300', 400, 500, 600, 700, 800), including: a test sequence providing module (301), configured to provide a test sequence (PRBS) to a to-be-tested sequential device (303); a clock driving module (307, 407, 507, 607, 707, 807), configured to provide a clock signal (759) to the to-be-tested sequential device (303), which includes a first clock driving circuit (610, 710), wherein the first clock driving circuit (610, 710) includes: a plurality of first clock paths (421, 423) which respectively provide corresponding clock signals (759); and a logic unit (427, 715) which generates, based on at least part of the clock signals (759) provided by the plurality of first clock paths (421, 423), a (Continued)

first clock signal with an adjusted pulse width, for the to-be-tested sequential device (303); and a verification module (305, 405, 805), configured to verify an output of the to-be-tested sequential device (303).

16 Claims, 10 Drawing Sheets

(58) Field of Classification Search
CPC .... G01R 31/318522; G01R 31/318525; G01R 31/31853; G11C 29/12015; G11C 29/14
See application file for complete search history.

(56) References Cited

U.S. PATENT DOCUMENTS

| | | | |
|---|---|---|---|
| 5,488,614 A * | 1/1996 | Shima | G01R 31/318541 |
| | | | 714/715 |
| 6,486,651 B1 | 11/2002 | Lee et al. | |
| 7,526,694 B1 * | 4/2009 | Jairam | G01R 31/318519 |
| | | | 714/725 |
| 8,453,085 B2 | 5/2013 | Ge et al. | |
| 8,726,114 B1 | 5/2014 | Vahidsafa et al. | |
| 11,085,965 B2 * | 8/2021 | Cote | G01R 31/318552 |
| 2002/0136064 A1 | 9/2002 | Yoshiyama | |
| 2007/0061649 A1 | 3/2007 | Kim | |
| 2007/0229134 A1 | 10/2007 | Hamdan et al. | |
| 2008/0116899 A1* | 5/2008 | Mitsuhashi | G01R 31/31917 |
| | | | 324/537 |
| 2008/0218179 A1 | 9/2008 | Hasegawa | |
| 2010/0039157 A1 | 2/2010 | Kaeriyama et al. | |
| 2010/0102890 A1* | 4/2010 | Stratz | G11C 29/50012 |
| | | | 331/44 |
| 2012/0047478 A1 | 2/2012 | Ge et al. | |
| 2012/0124423 A1 | 5/2012 | Chakravadhanula et al. | |
| 2013/0200931 A1* | 8/2013 | Kono | H03H 11/16 |
| | | | 327/147 |
| 2014/0176167 A1 | 6/2014 | Seo et al. | |
| 2018/0217206 A1 | 8/2018 | Kiuchi | |

FOREIGN PATENT DOCUMENTS

| | | | |
|---|---|---|---|
| CN | 102169515 A | | 8/2011 |
| CN | 102254062 A | | 11/2011 |
| CN | 104698370 A | | 6/2015 |
| CN | 107291421 A | | 10/2017 |
| CN | 111736059 A | | 10/2020 |
| CN | 109660232 A | | 12/2021 |
| CN | 215180689 U | | 12/2021 |
| KR | 1019920005167 A | | 3/1992 |
| KR | 1019920005171 A | | 3/1992 |
| KR | 1020010047839 A | | 6/2001 |
| KR | 20070022556 A | | 2/2007 |
| KR | 100706835 B1 | | 4/2007 |
| KR | 1020080108330 A | | 12/2008 |
| KR | 1020090047027 A | | 5/2009 |
| KR | 1020100137071 A | | 12/2010 |
| TW | 576997 B | | 2/2004 |
| WO | 2007103748 A1 | | 9/2007 |

OTHER PUBLICATIONS

Search Report for corresponding TW application 111100571 (2 pages including English Translation).
International Search Report for PCT/CN2022/070473 dated Mar. 16, 2022 (8 pages which includes English Translation).
Written Opinion of the International Searching Authority for PCT/CN2022/070473 dated Apr. 23, 2023 (4 pages).
First Office Action issued on 09/2342024 for corresponding CN Application No. 202110048109.2 (22 pages including English Translation).
Notice of Allowance dated 2025 01 05 for corresponding KR Application No. 10-2023-7027506 (9 pages including English Translation).

* cited by examiner

TEST CIRCUIT, TEST METHOD, AND COMPUTING SYSTEM COMPRISING TEST CIRCUIT FOR TESTING SEQUENTIAL CIRCUIT IN PIPELINE STAGE

CROSS-REFERENCE TO RELATED APPLICATIONS

This application is a National Stage Application of International Application No. PCT/CN2022/070473, filed on Jan. 6, 2022, which claims the benefit of Serial No. 202110048109.2, filed on Jan. 14, 2021 in China and which applications are incorporated herein by reference. To the extent appropriate, a claim of priority is made to each of the above disclosed applications.

TECHNICAL FIELD

The present disclosure relates to a test circuit, a test method, and a computing system including the test circuit.

BACKGROUND

In recent years, digital currency has attracted increasingly more attention. In related fields, an improved processor and computing system are needed.

A mining machine processor is usually designed to adopt a pipeline structure. Operational logic is divided into several pipeline stages according to an algorithm, and each pipeline stage has a similar functional design and operation structure. Each pipeline stage needs to be inputted with a working clock, that is, a pulse clock.

Since a computing unit in a Bitcoin chip is composed of a multi-stage pipeline, and each pipeline stage is mainly composed of multi-bit flip-flops, the optimal design of flip-flops is one of the core directions to improve the performance of the Bitcoin chip and reduce power consumption. Different flip-flops are used in different pipelines in the chip according to their own conditions. Meanwhile, a direction and an internal structure of a clock tree connecting multi-stage pipelines are selected based on experience and analysis. In consideration of SPICE simulation of the flip-flop, some differences exist between static timing analysis and produced chips, and the clock tree structure selected by the chip is usually conservative, but not necessarily optimal.

Moreover, with the use of more advanced manufacturing process in the production of the mining machine processor, the complexity and dispersion of the process are increasingly higher, which leads to a large deviation between the actual working condition of the processor and the simulation environment in the design stage. Even if a clock driving circuit meets the requirement for the clock under the simulation condition in the design stage, the pipeline clock of some of the actual processors often fails to meet the design requirements due to the difference between the actual processors and the simulation environment.

Therefore, an improved test circuit, test method, and processor including the test circuit are required.

SUMMARY

According to an aspect of the present disclosure, there is provided a test circuit, comprising: a test sequence providing module, configured to provide a test sequence to a to-be-tested sequential device; a clock driving module, configured to provide a clock signal to the to-be-tested sequential device, wherein the clock driving module comprises a first clock driving circuit, and the first clock driving circuit comprises: a plurality of first clock paths, configured to provide corresponding clock signals, respectively; and a logic unit, configured to generate a first clock signal with an adjusted pulse width for the to-be-tested sequential device based on at least part of clock signals provided by the plurality of first clock paths; and a verification module, configured to verify an output of the to-be-tested sequential device.

In some embodiments, the verification module comprises: a reference sequential device, wherein the test sequence is synchronously provided to the reference sequential device and the to-be-tested sequential device, and the first clock driving circuit further provides a second clock signal to the reference sequential device; and a comparison module, configured to compare an output of the reference sequential device with the output of the to-be-tested sequential device.

In some embodiments, the plurality of first clock paths receive a common clock input and provide clock signals with different phases based on the clock input, respectively.

In some embodiments, at least one of the first clock paths further comprises: a first selector, configured to select a clock signal from clock signals provided by a plurality of sub-paths of the corresponding first clock path and provide the selected clock signal to the logic unit.

In some embodiment, the clock driving module further comprises a second clock driving circuit, and wherein the second clock driving circuit comprises: a plurality of second clock paths, configured to provide clock signals with different phases, respectively, wherein at least one of the plurality of second clock paths provides a clock signal based on the first clock signal; and a second selector, configured to select a clock signal from the clock signals provided by the plurality of second clock paths for the to-be-tested sequential device.

In some embodiments, the clock driving module further comprises a third clock driving circuit, and wherein the third clock driving circuit comprises: a plurality of third clock paths, configured to provide clock signals with different phases, respectively; and a third selector, configured to select a clock signal from the clock signals provided by the plurality of third clock paths for at least one of the plurality of first clock paths.

In some embodiments, the plurality of first clock paths comprise at least a first path and a second path, the first path provides the selected clock signal to the logic unit and the second path provides an inverted version or an inverted and delayed version of the selected clock signal to the logic unit.

In some embodiments, the second path comprises: an inverter, configured to receive the selected clock signal and generate a clock signal which is inverted to the selected clock signal; one or more sub-paths, configured to provide corresponding versions of the inverted clock signal to a fourth selector, respectively, and the fourth selector, configured to select a version from the different versions of the inverted clock signal and provide the selected version to the logic unit.

In some embodiments, the one or more sub-paths provide different delayed versions of the inverted clock signal to the fourth selector, respectively.

In some embodiments, the logic unit is an AND gate or an OR gate.

In some embodiments, the test sequence providing module provides a test sequence with a check code to the to-be-tested sequential device; and the test circuit further comprises a check module configured to check the output of the to-be-tested sequential device by using the check code.

In some embodiment, the sequential device is a flip-flop or a latch.

In some embodiment, the test circuit further comprises an additional sequential device associated with the to-be-tested sequential device.

According to another aspect of the disclosure, there is provided a computing system, comprising the test circuit according to any embodiment of the disclosure.

According to still another aspect of the disclosure, a test method for a test circuit is provided, wherein the test circuit is the test circuit according to any embodiment of the disclosure, and the method comprises: providing clock signals with different configurations to the to-be-tested sequential device by the clock driving module; providing a test sequence to an input of the to-be-tested sequential device; and detecting whether an output of the to-be-tested sequential device meets a requirement under the clock signal with each configuration.

In some embodiment, the method further comprises: determining a corresponding clock configuration or clock configuration range that meets the requirement; determining a difference between a predetermined timing parameter range designed for the to-be-tested sequential device and the corresponding clock configuration determined to meet the requirement through testing; and modifying a circuit design of the to-be-tested sequential device and/or process parameters for manufacturing the to-be-tested sequential device according to the difference.

Through detailed descriptions of exemplary embodiments of the present disclosure with reference to the following accompanying drawings, other features and advantages of the present disclosure would become clear.

BRIEF DESCRIPTION OF THE DRAWINGS

The accompanying drawings that constitute a part of the specification illustrate embodiments of the present disclosure, and are used to explain the principle of the present disclosure together with the specification.

With reference to the accompanying drawings, according to the following detailed descriptions, the present disclosure may be understood more clearly, wherein.

Figure 1:
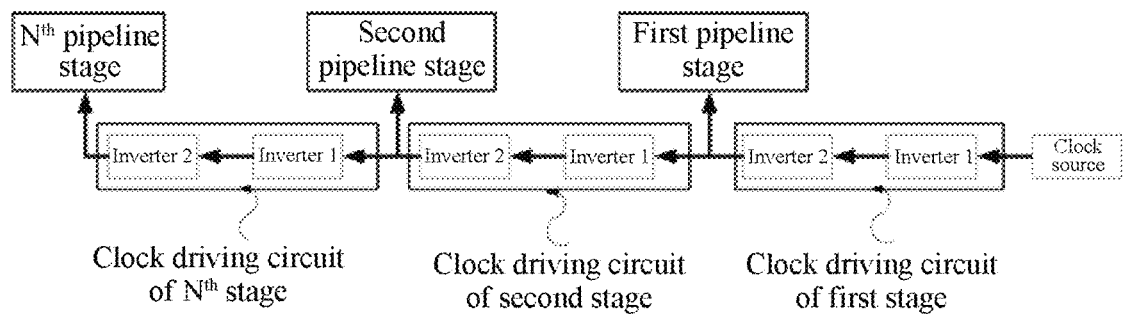
FIG. 1 shows a schematic diagram of an exemplary pipeline.

It is to be noted that in the following implementations illustrated, sometimes the same reference sign is used in different accompanying drawings to represent the same part or a part with the same function, and repeated illustration thereof is omitted. In the present description, similar reference signs or letters are used for indicating similar items. Therefore, once an item is defined in one accompanying drawing, the item does not need to be further discussed in the subsequent accompanying drawings.

For ease of understanding, sometimes the position, size, range and the like of each structure shown in the accompanying drawings may not indicate the actual position, size, range, and the like. Therefore, the disclosed invention is not limited to the position, size, range, and the like disclosed in the accompanying drawings.

DETAILED DESCRIPTION

Various exemplary embodiments of the present disclosure are described in detail with reference to the accompanying drawings now. It should be noted that unless illustrated in detail otherwise, the relative arrangement of the components and steps, the numerical expression and the values stated in these embodiments do not limit the scope of the present disclosure. In addition, the technology, method and device known to a person of ordinary skill in the related art may not be discussed in detail, but in proper circumstances, the technology, method and device shall be regarded as a part of the authorized description.

It should be understood that the following description of at least one exemplary embodiment is merely illustrative, and is not as any limitation to the present disclosure and to application or use thereof. It should be further understood that any implementation exemplarily described herein is not necessarily to be explained as preferred or advantageous over other implementations. The present disclosure is not limited by any expressed or implied principle given in the foregoing technical field, background, summary, or detailed description.

Furthermore, some terms may also be used in the following description for a reference purpose only, and thus are not intended for a limitation. For example, the terms "first" "second" and other such numerical terms relating to the structure or element do not imply the sequence or the order unless the context clearly indicates otherwise.

It should be further understood that the word "comprise/include", when used herein, specifies the presence of the stated features, integers, steps, operations, units, and/or components, but do not preclude the presence or addition of one or more other features, integers, steps, operations, units, and/or components, and/or combinations thereof.

Pipeline technology is a quasi-parallel processing implementation technology that performs operation by a plurality of instructions that overlap during execution of a program. A pipeline stage of a processor often has one or more sequential devices, for example, a flip-flop. However, selecting a latch as the sequential device in the pipeline can effectively reduce power consumption and area overheads and enhance the competitiveness of mining machine products.

In the design of a synchronous circuit, each sequential device is controlled by a corresponding clock. A large number of sequential devices are arranged in the chip, and all of the sequential devices cannot be controlled by the same clock (the load capacity of the clock is not enough). Therefore, it is necessary to use an inverter (inv) or a buffer (buf) to transfer a clock signal. These stages of inv and buf for transfer constitute a clock tree.

FIG. 1 shows a schematic diagram of an exemplary pipeline processor. A pipeline in a processor may include a plurality of pipeline stages. Working clocks of all the pipeline stages usually come from the same clock source, and are transferred among all the pipeline stages through stages of clock driving circuits for all of the pipeline stages, as shown in FIG. 1.

A four-stage pipeline processor is used as an example, and execution of one instruction needs four periods (fetching instruction, decoding, fetching operand, and executing). However, after the fourth period, one instruction is executed in each period, and it seems that one instruction can be executed in only one period. The pipeline technology can improve execution efficiency, obtain higher throughput, and improve performance of the processor.

The pipeline technology may be applied to processors in the digital currency field. For example, Bitcoin uses the hash SHA256 algorithm. The SHA256 algorithm may be divided into several pipelined computing units according to the division of different computing units, thereby forming an operation pipeline. A general pipeline may be divided into 32 stages, 64 stages, 128 stages, and so on.

In addition, in the synchronous sequential circuit design of the pipeline, sampling is usually only performed on a rising edge or a falling edge of a clock. In order to obtain a correct sampling result, it is necessary to ensure that the data at the sampling timing is valid and that the data satisfies a setup time and a hold time. Therefore, the design tool may perform static timing analysis on the comprehensive result to determine whether a relative relationship between the clock and the data meets the requirement.

Figure 2A:
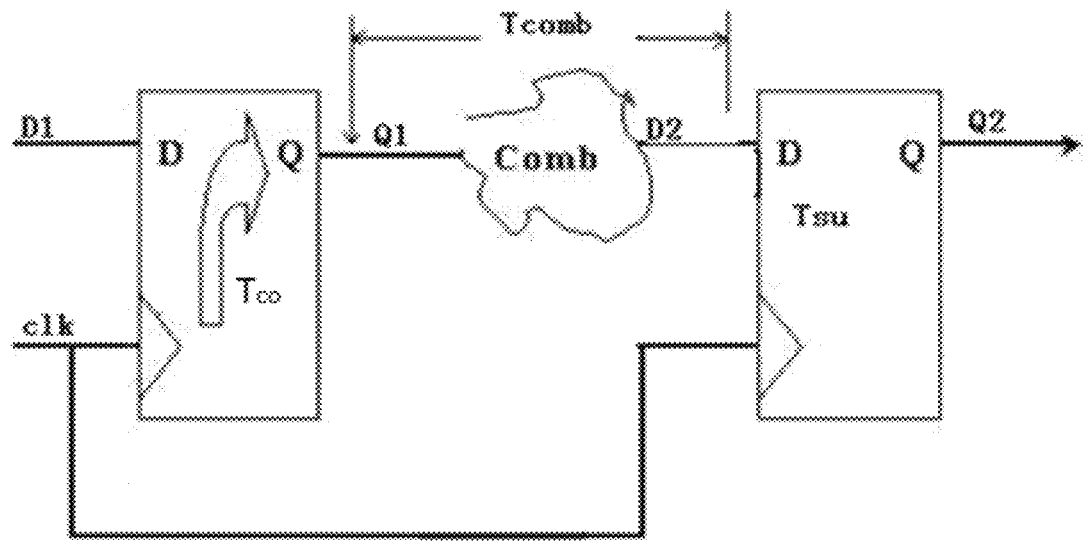
FIG. 2A shows a schematic diagram of an exemplary circuit including a path between sequential devices.

A circuit including a sequential device-a sequential device and a path between the sequential devices is used as an example for description below. FIG. 2A shows a schematic diagram of an exemplary circuit including a path between sequential devices. The diagram is a common circuit diagram of digital system design. Herein, it is necessary to ensure that data can be transmitted correctly between two flip-flops, so as to determine a range of transmission delays of an intermediate combinational logic circuit Comb.

Figure 2B:
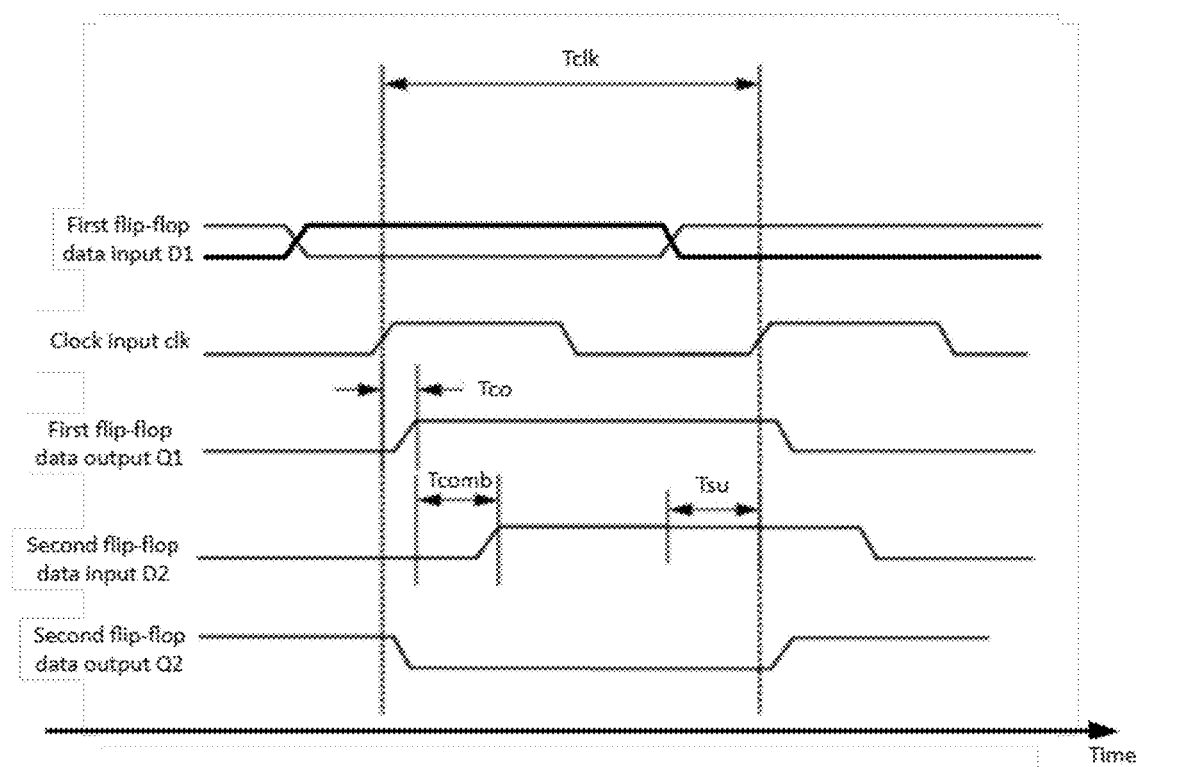
FIG. 2B shows a timing diagram of a setup time for the circuit shown in FIG. 2A.

FIG. 2B shows a timing diagram of a setup time for the circuit shown in FIG. 2A. D1 represents an input to the front flip-flop (referred to as a launch flip-flop) in FIG. 2A. At a first clock rising edge of the clock CLK, the launch flip-flop in FIG. 2A acquires a D1 signal, and a high level is inputted to the flip-flop and reaches the combinational logic circuit Comb after an output latency Tco of the flip-flop. Then the high level is sent to a D2 interface after the latency Tcomb of the combinational logic circuit Comb (herein, it is assumed that the combinational logic circuit does not change the signal level at this time, and therefore may be considered as a buffer). Before a second clock rising edge arrives, the signal on a D2 data line should satisfy a settle time>the setup time Tsu of the flip-flop.

That is, the clock period $Tclk-Tco-Tcomb>Tsu$ should be satisfied.

Considering the worst case: an output latency of the flip-flop is the largest (Tco-max), and the latency of the combinational logic circuit is also the largest (Tcomb-max). It may be obtained as follows:

$$Tclk-Tco\text{-max}-Tcomb\text{-max}>Tsu$$

Figure 2C:
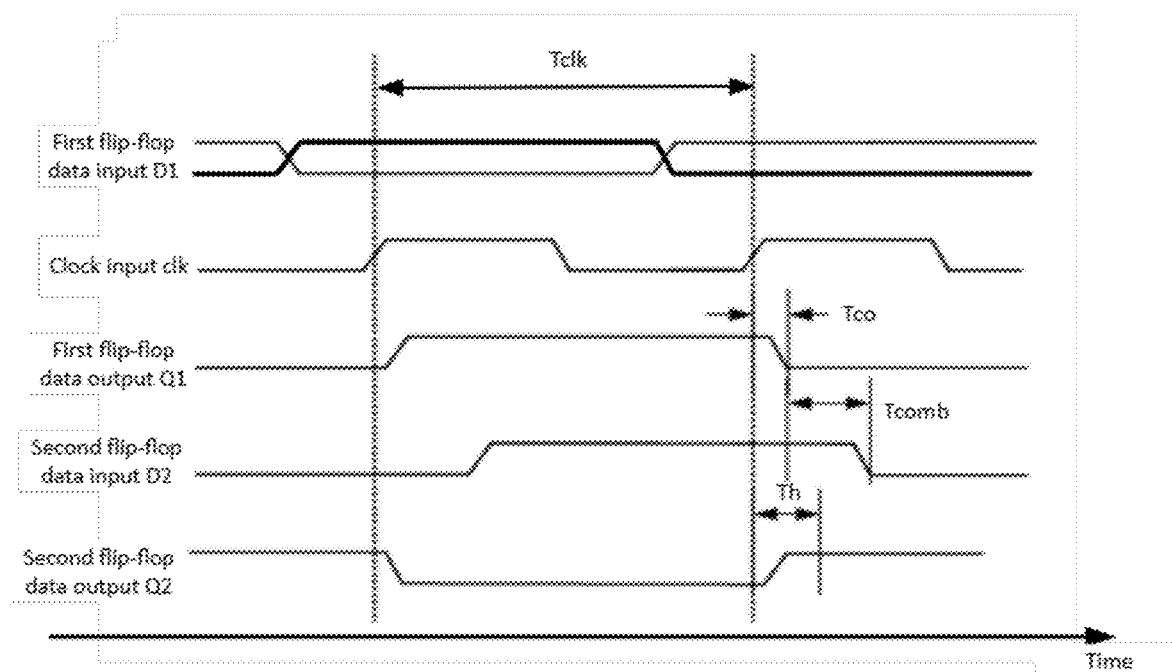
FIG. 2C shows a timing diagram of a hold time for the circuit shown in FIG. 2A.

The previous timing diagram is followed to continue describing the hold time. For clarity of illustration, FIG. 2C shows a timing diagram for describing the hold time of the circuit shown in FIG. 2A, in which each signal is the same as that shown in FIG. 2B. At the second clock rising edge, the front launch flip-flop acquires the low level on D1, which is expressed on Q1 after the latency Tco. The low level reaches D2 after the latency Tcomb of the combinational logic circuit. After the latency of Tco+Tcomb, the settle time of the original high level on D2 after the arrival of the second clock rising edge needs to be greater than the hold time Th of a second flip-flop. When this condition is satisfied, the subsequent flip-flop can stably receive the high level initially transmitted by D1. That is, $$Tco+Tcomb>Th$$

Considering the worst case: an output latency of the flip-flop is the smallest (Tcomb-min), and the latency of the combinational logic circuit is also the smallest (Tco-min):

$$Tco\text{-min}+Tcomb\text{-min}>Th$$

The premise of normal operation of the synchronous sequential circuit is that the setup time and the hold time of the flip-flop are both satisfied. However, the hold time is a more important indicator and must be satisfied. If the hold time is not satisfied, the chip may not operate normally.

In addition, in the design of a synchronous circuit, each sequential device is controlled by a corresponding clock. A large number of sequential devices are arranged in the chip, and all of the sequential devices cannot be controlled by the same clock (the load capacity of the clock is not enough). Therefore, it is necessary to use an inverter (inv) or a buffer (buf) to transfer a clock signal. These stages of inv and buf for transfer constitute a clock tree.

In the pipeline design, if the transfer direction of the clock signal is the same as the data flow transfer direction, the clock tree is referred to as a forward clock tree (as shown below). Conversely, the clock tree is referred to as a reverse clock tree.

Figure 2D:
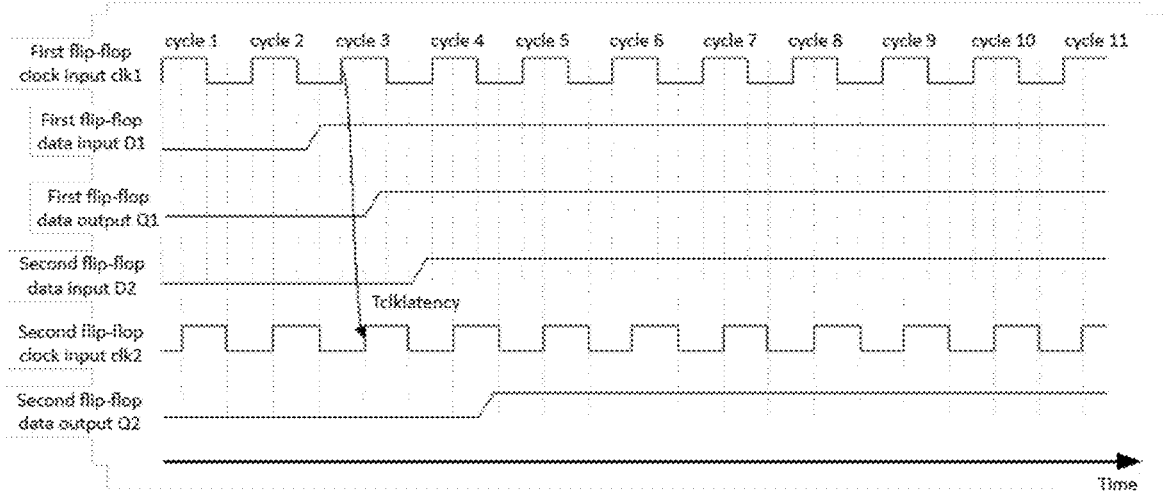
FIG. 2D shows a schematic timing diagram of a forward clock tree of a pipeline.

For the forward clock tree, a case that the instance shown in FIG. 2A is applied to two pipeline stages is considered. This case is equivalent to a case that the clock is connected to the first flip-flop and then reaches the second flip-flop after a latency of one-stage clock driving circuit. The timing diagram is shown in FIG. 2D, in which the latency (a Tclk latency, herein denoted as Tclklatency) of the clock driving circuit is shown.

For Tsu, herein, timing needs to satisfy $Tclk+Tclklatency-Tco\text{-max}-Tcomb\text{-max}>Tsu$.

That is, $Tclk>Tsu+Tco\text{-max}+Tcomb\text{-max}-Tclklatency$.

If Tclk may be smaller and the period is shorter, the frequency of the chip may be faster to achieve higher performance. However, the forward clock tree has a disadvantage that the hold time is not easy to meet.

For the hold time Th, it is necessary to satisfy:

$$Tco\text{-min}+Tcomb\text{-min}>Th+Tclklatency,$$

that is, $Tco\text{-min}+Tcomb\text{-min}-Tclklatency>Th$.

Figure 2E:
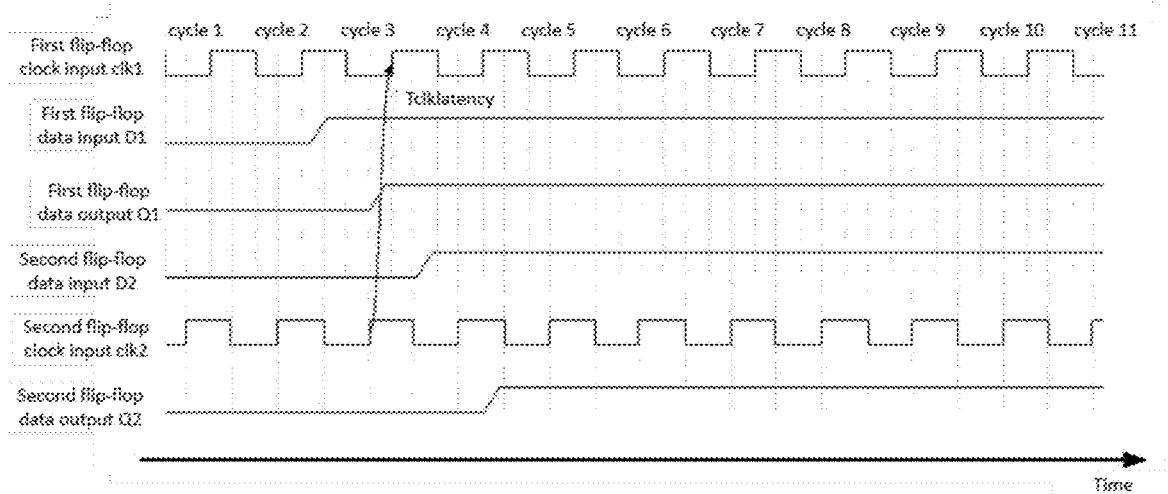
FIG. 2E shows a schematic timing diagram of a reverse clock tree of a pipeline.

For the reverse clock tree, a case that the instance shown in FIG. 2A is applied to the front and subsequent two pipeline stages is considered. This is equivalent to the clock being connected to the second flip-flop and then reaching the first flip-flop after the latency of a one-stage clock driving circuit. The timing diagram is shown in FIG. 2E, in which the latency (a Tclk latency, herein denoted as Tclklatency) of the clock driving circuit is shown.

For Tsu, timing needs to satisfy:

$$T\text{clk}-T\text{clklatency}-T\text{co-max}-T\text{comb-max}>T\text{su},$$

that is, $T\text{clk}>T\text{su}+T\text{co-max}+T\text{comb-max}+T\text{clklatency}.$ If Tclk is larger, the period is longer, the frequency of the chip is slower, and the performance is degraded. The advantage of the reverse clock tree is that the hold time of the flip-flop is easier to meet.

For the hold time Th, the timing needs to satisfy:

$$T\text{co-min}+T\text{comb-min}>Th-T\text{clklatency},$$

that is, $T\text{co-min}+T\text{comb-min}+T\text{clklatency}>Th.$

For the pipeline design using the latch, the clocks between adjacent pipelines need to meet certain phase requirements to meet the specific timing requirement of the latch, for example, requirement for hold timing of the latch and requirement for a minimum pulse width of the latch, which imposes higher requirements for the design and manufacturing process of a clock-related circuit.

However, with the use of advanced process, the complexity and dispersion of the process are increasingly higher, which leads to a large deviation between the actual working condition of the processor and the simulation environment in the design stage. In this way, even if a clock driving circuit meets the requirement for the clock under the simulation condition in the design stage, the pipeline clock of some of the actual processors often fails to meet the design requirements due to the difference between the actual processors and the simulation environment. This also causes the yield of the processor to be limited.

The inventor of this application has realized one or more of the above problems, and proposed an improved test circuit and test method disclosed herein.

Figure 3A:
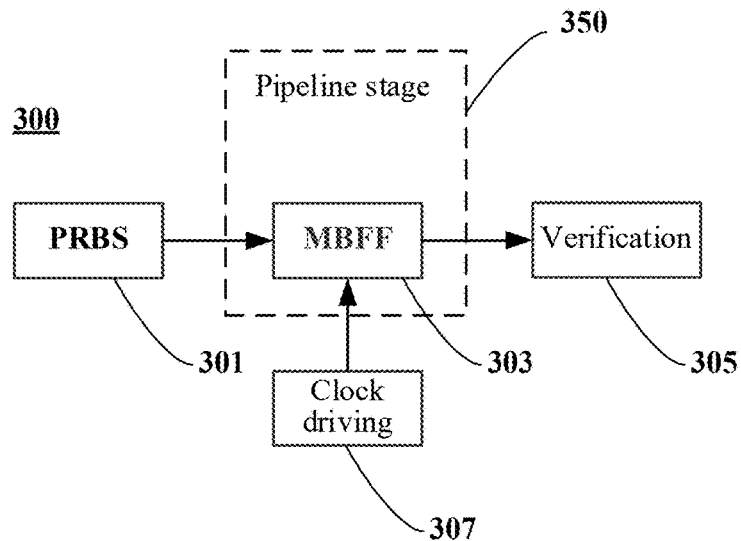
FIG. 3A shows a schematic diagram of a test circuit according to an embodiment of the present disclosure.

FIG. 3A shows a schematic diagram of a test circuit according to an embodiment of the present disclosure. As shown in FIG. 3A, a test circuit 300 is configured to test a to-be-tested sequential device 303. The to-be-tested sequential device may include (but not limited to) any device that needs clock control, for example, a register, a flip-flop, a latch, or the like. In the figure, as an example, the to-be-tested sequential device is shown as a multi-bit flip-flop (MBFF).

In some embodiments, the to-be-tested sequential device 303 may be arranged in a pipeline stage, for example, in a pipeline stage 350 shown in the figure. In some other embodiments, the to-be-tested sequential device 303 may be arranged outside the pipeline stage to facilitate testing.

As shown in FIG. 3A, the test circuit 300 includes a test sequence providing module 301 configured to provide a test sequence to the to-be-tested sequential device 303. The test sequence may include, for example, a pseudo-random bit sequence (PRBS) or a PRBS including a check code.

The test circuit 300 further includes a clock driving module 307 configured to provide a clock signal to the to-be-tested sequential device. The test circuit 300 further includes a verification module 305 configured to verify an output of the to-be-tested sequential device.

Figure 3B:
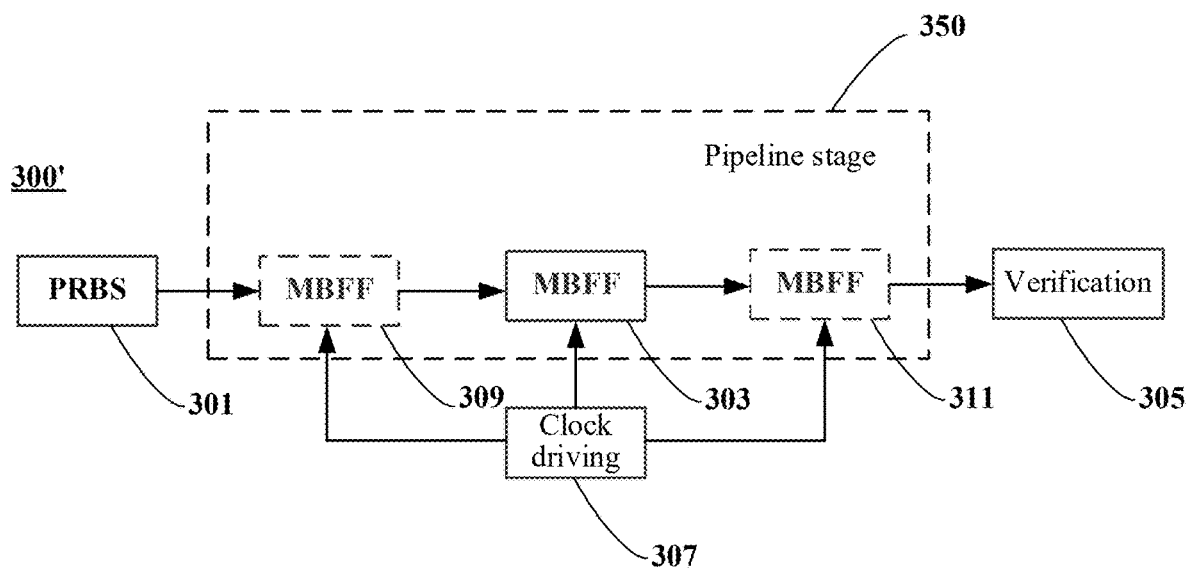
FIG. 3B shows a schematic diagram of a test circuit according to another embodiment of the present disclosure.

FIG. 3B shows a schematic diagram of a test circuit according to another embodiment of the present disclosure.

As shown in FIG. 3B, a test circuit 300' may further include additional sequential devices such as sequential devices 309 and 311 located upstream and downstream of the to-be-tested sequential device 303 in addition to the test sequence providing module 301, the clock driving module 307, and the verification module 305. One or more of the sequential devices 309 and 311 may be included in the same pipeline stage 350 together with the to-be-tested sequential device 303.

Figure 4:
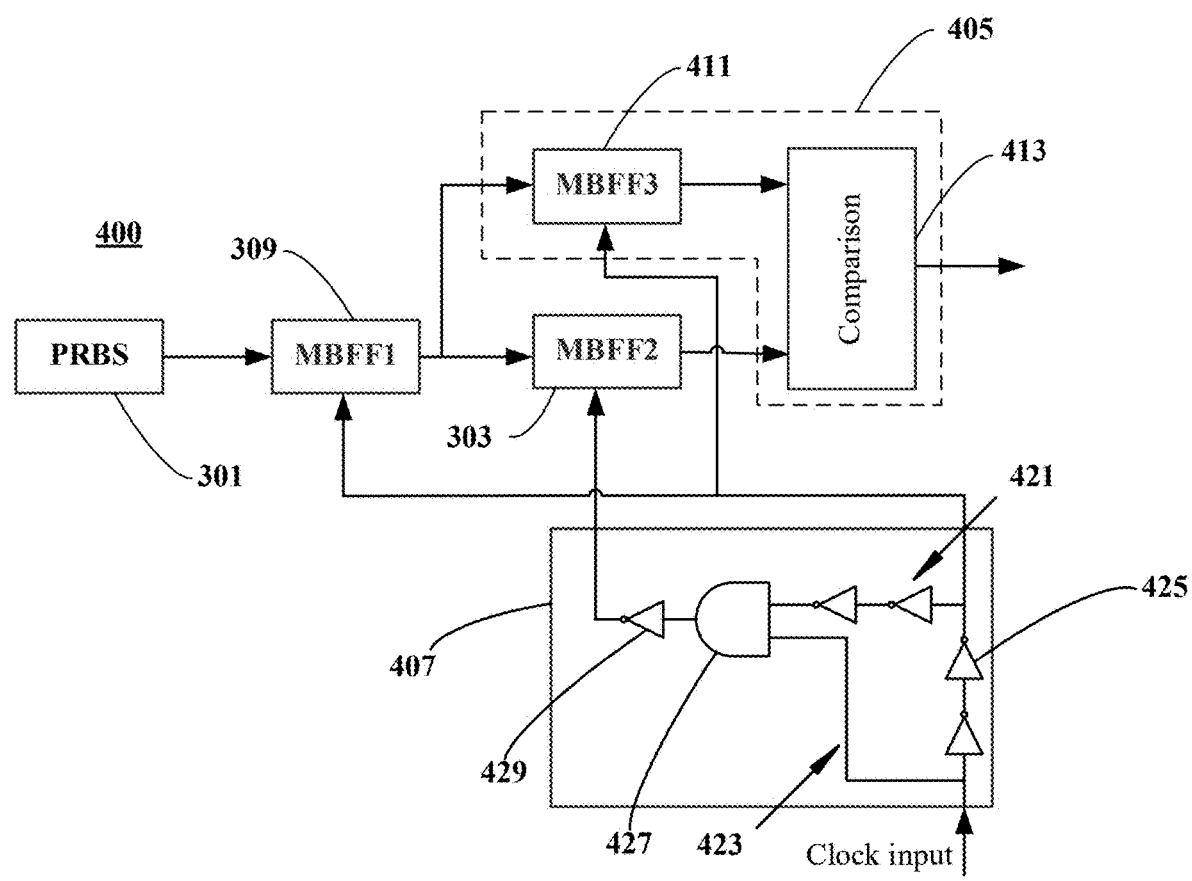
FIG. 4 shows a schematic diagram of a test circuit according to still another embodiment of the present disclosure.

FIG. 4 shows a schematic diagram of a test circuit according to still another embodiment of the present disclosure. As shown in FIG. 4, the test circuit 400 includes the test sequence providing module 301 configured to provide a test sequence to the to-be-tested sequential device 303. The test sequence may include, for example, a PRBS or a PRBS including a check code. FIG. 4 further shows an additional intermediate sequential device 309, which is shown as an MBFF (denoted by MBFF1), and the to-be-tested sequential device 303 is shown as an MBFF (denoted by MBFF2).

The test circuit 400 further includes a clock driving module 407 configured to provide a clock signal to the to-be-tested sequential device. FIG. 4 shows a specific implementation of the clock driving module. As shown in FIG. 4, the clock driving module 407 may include such a clock driving circuit (a first clock driving circuit). The clock driving circuit may include: a plurality of clock paths (first clock paths) 421 and 423, configured to provide corresponding clock signals, respectively; and a logic unit 427, configured to generate a first clock signal with an adjusted pulse width for the to-be-tested sequential device based on at least part of clock signals provided by the plurality of clock paths (first clock paths). In some embodiments, the logic unit 427 may be an AND gate or an OR gate.

It should be noted herein that "the clock signal for the to-be-tested sequential device" is intended to mean that the clock signal may be directly used for (for example, directly provided to) the to-be-tested sequential device, or the clock signal may be indirectly used for (for example, indirectly rather than directly provided to) the to-be-tested sequential device. In other words, an intermediate module or device may exist between the clock signal and the to-be-tested sequential device, and the intermediate module or device may provide a clock to the to-be-tested sequential device based on the clock signal. Furthermore, although only two clock paths are shown herein, it should be understood that more clock paths may be arranged.

As shown in the figure, the clock paths 421 and 423 may receive a common clock input and provide clock signals with various phases based on the clock input, respectively. For example, the clock path 421 in the figure has four phase adjustment units 425 (for example, inverters (as shown in the figure), buffers, or the like), thereby providing delays of four units with respect to the input clock. However, the clock path 423 does not provide an additional delay. The latency of a passive line is not considered herein, but only the latency brought by the device or unit is considered.

It should be further understood that, in some embodiments, the clock paths provide different delays with respect to each other and/or provide inversion to the input clock. In some other embodiments, some clock paths may also provide the same delay or inversion. For example, each clock path may or may not have a phase adjustment unit, or may have more or less phase adjustment units. The phase adjustment units may be the same or different, or may be configured jointly or separately.

The test circuit 400 further includes a verification module 405 configured to verify an output of the to-be-tested sequential device. In the embodiment shown in FIG. 4, the verification module 405 may include a reference sequential device 411 and a comparison module 413. The test sequence PRBS is synchronously provided to the reference sequential device 411 and the to-be-tested sequential device 303 (may or may not pass through the optional intermediate device MBFF1). The clock driving module 407 further provides a clock signal (a second clock signal) to the reference sequential device 411. The comparison module 413 is configured to compare an output of the reference sequential device with the output of the to-be-tested sequential device.

Herein, as an example, the reference sequential device 411 may have the same circuit structure or the same circuit design as the to-be-tested sequential device, but the reference sequential device 411 may be manufactured based on a standard cell library, an IP library, or a process angle provided by a manufacturer or a designer or a third party. However, it should be understood that the present disclosure is not limited thereto. For example, the so-called reference sequential device may also be customized or designed or manufactured based on experience, as long as it can be used as a reference.

In addition, no particular limitation is imposed on the second clock signal. The second clock signal may be obtained from any part of any first clock path or from a clock input or other sources, as long as the subsequent comparison module can compare the output of the reference sequential device with the output of the to-be-tested sequential device.

The comparison module 413 may compare the output of the reference sequential device with the output of the to-be-tested sequential device based on a certain standard, for example, whether the output of the reference sequential device and the output of the to-be-tested sequential device are synchronous or consistent or meet the timing requirements, whether logic values correspond, or the like. In this way, a result of the test is determined by the comparison module 413.

The clock driving module 407 may further include an additional phase adjustment unit, for example, a phase adjustment unit 429 shown in FIG. 4. The phase adjustment unit 429 herein is shown as an inverter 429 located downstream of the logic unit 427. However, it should be understood that this is only exemplary and does not constitute a limitation. The types, positions, and numbers of the additional phase adjustment units are not limited thereto. For example, as an alternative embodiment of the clock driving module 407 shown in FIG. 4, the inverter 429 may be removed, and additional inverters may be respectively added in the clock paths 421 and 423.

In addition, in different embodiments, the intermediate device 309 may be in the same pipeline stage as or different pipeline stages from the to-be-tested sequential device 303. Preferably, the reference sequential device 411 may be in the same pipeline stage as the to-be-tested sequential device 303. Alternatively, in some other embodiments, the to-be-tested sequential device 303 may be arranged outside the pipeline stage, for example, outside the pipeline stage where the intermediate device 309 or 311 or the reference sequential device 411 is located, for example, may be located adjacent to the pipeline stage. In this case, the to-be-tested device will not participate in the actual instruction operation of the pipeline. Therefore, the impact of devices and test operations on the pipeline stage can be tested, and the impact on the pipeline can be minimized while increasing the convenience of testing.

Figure 5:
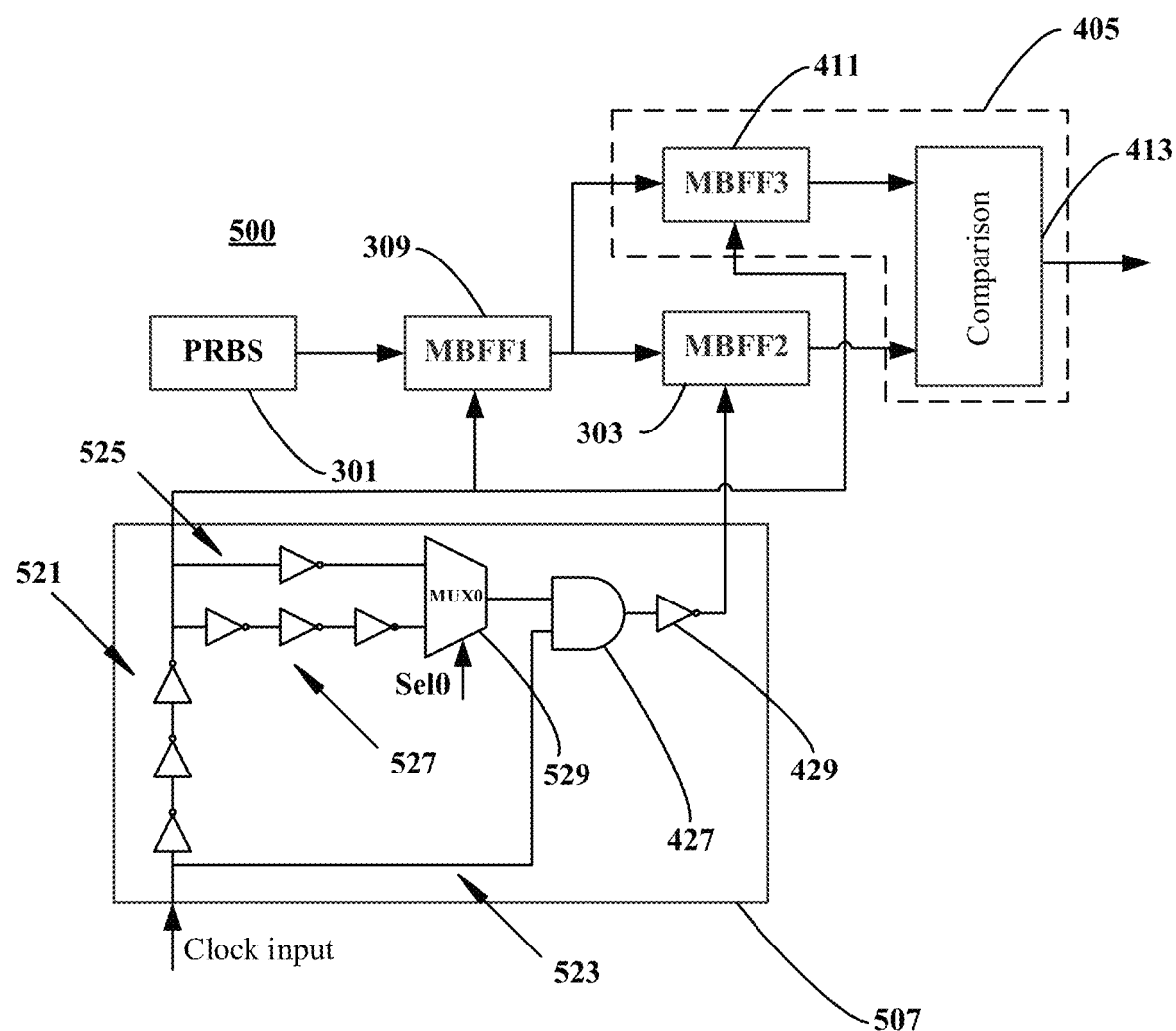
FIG. 5 shows a schematic diagram of a test circuit according to yet another embodiment of the present disclosure.

FIG. 5 shows a schematic diagram of a test circuit according to yet another embodiment of the present disclosure. A test circuit 500 shown in FIG. 5 is substantially the same as the test circuit 400 shown in FIG. 4 except for a clock driving module 507. In FIG. 5, the same components as those shown in FIG. 4 are denoted by the same reference numerals. In addition, the description of the same components is not repeated herein.

The clock driving module 507 for the test circuit 500 is to be described in detail below. Compared with the driving circuit 407 shown in FIG. 4, a selector (a first selector) 529 is added in a clock path (a clock path 521 is used as an example herein) of the clock driving module 507, which is configured to select a clock signal from clock signals provided by a plurality of sub-paths 525 and 527 of the corresponding clock path (that is, the clock path 521) and provide the selected clock signal to the logic unit 427.

Furthermore, although only two sub-paths are shown herein, it should be understood that more sub-paths may be arranged. The sub-paths may receive the same clock signal and provide clock signals with various phases to the selector 529. In some embodiments, the sub-paths each provide different delays with respect to each other and/or provide inversion to the received input clock. In some other embodiments, some sub-paths may also provide the same delay or phase inversion. For example, the sub-paths may be provided with one or more phase adjustment units, such as inverters or buffers, or the like, or some sub-paths may not be provided with phase adjustment units. For example, in the example shown in FIG. 5, the sub-path 525 has one inverter and the sub-path 527 has three inverters.

The selector 529 may be a multiplexer MUX0, but the present disclosure is not limited thereto. The selector 529 may perform selection from the plurality of sub-paths 525 and 527 and the like, based on a control signal Sel0 to provide the clock signal on the selected path to the logic unit 427.

According to the embodiment of the present disclosure, the clock signal for the to-be-tested device may be flexibly configured, thereby providing flexibility and convenience for testing.

Figure 6:
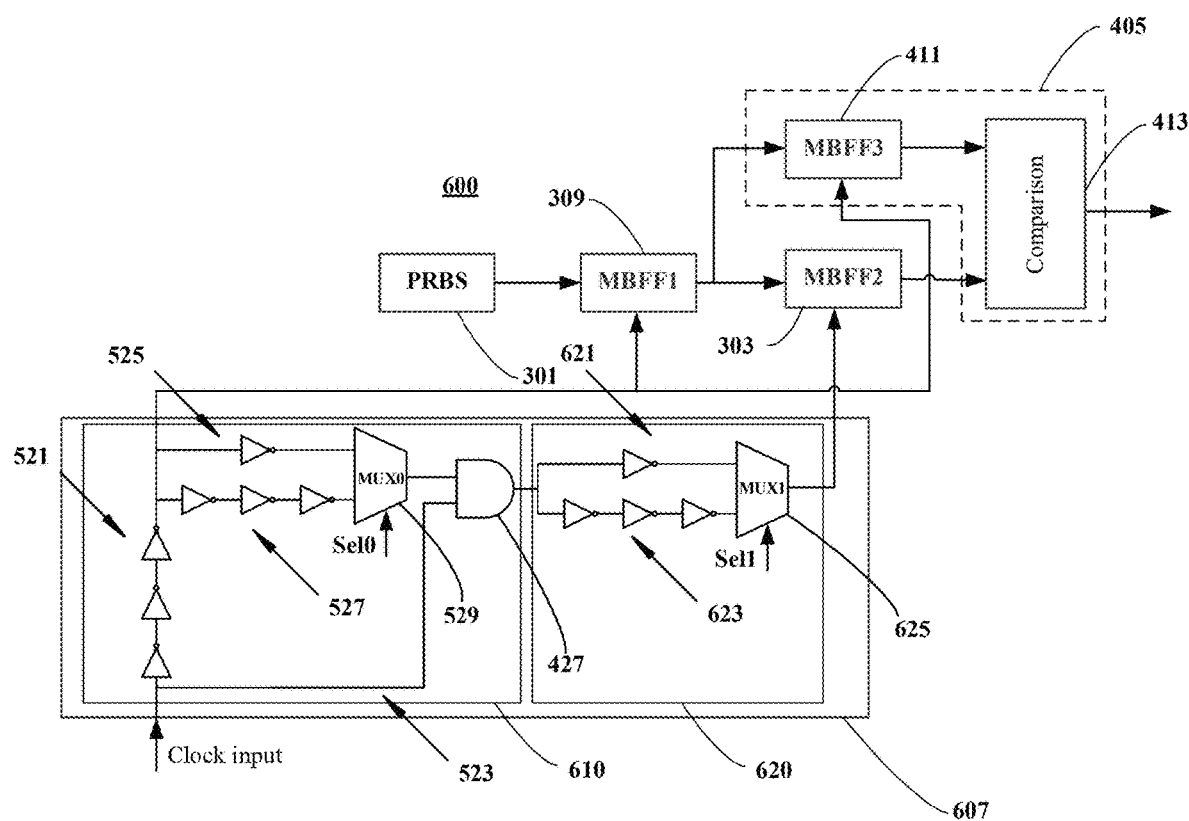
FIG. 6 shows a schematic diagram of a test circuit according to another embodiment of the present disclosure.

FIG. 6 shows a schematic diagram of a test circuit according to another embodiment of the present disclosure. A test circuit 600 shown in FIG. 6 is substantially the same as the test circuit 500 previously shown except for a clock driving module 607. In FIG. 6, the same components as those shown in the foregoing accompanying drawings are denoted by the same reference numerals. In addition, the description of the same components is not repeated herein.

The clock driving module 607 for the test circuit 600 is to be described in detail below. Compared with the driving module 507 shown in FIG. 5, the clock driving module 607 may further include a second clock driving circuit 620 in addition to at least part or all of the driving modules such as 407 or 507 described in the previous embodiments (which may be used as a first clock driving circuit 610). The second clock driving circuit 620 may include a plurality of clock paths (second clock paths) such as 621 and 623, which are configured to provide clock signals with different phases, respectively. In some embodiments, at least one of the plurality of second clock paths provides a clock signal based on the first clock signal.

Although only two second clock paths 621 and 623 are shown herein, it should be understood that more second clock paths may be arranged. The second clock paths may receive the same clock signal and provide clock signals with various phases to the selector 625. Similarly, in some embodiments, the sub-paths each provide different delays with respect to each other and/or provide inversion to the received input clock. In some other embodiments, some sub-paths may also provide the same delay or phase inversion. For example, each of the second clock paths may be provided with one or more phase adjustment units, such as inverters, buffers, or the like, or some paths may not be provided with phase adjustment units. For example, in the example shown in FIG. 6, the second clock path 621 has one inverter and the second clock path 623 has three inverters.

The second clock driving circuit 620 may further include a selector (a second selector) 625 configured to select a clock signal from the clock signals provided by the plurality of second clock paths for the to-be-tested sequential device. The selector 625 may select, based on a control signal Sell, a clock signal from the clock signals provided by the plurality of second clock paths. In the embodiment in FIG. 6, the selector 625 is shown as a multiplexer MUX1, but the present disclosure is not limited thereto.

According to the embodiment of the present disclosure, the clock signal for the to-be-tested device may be configured more flexibly, and clock signals with different delays and phases may be provided, thereby providing flexibility and convenience for testing.

Figure 7:
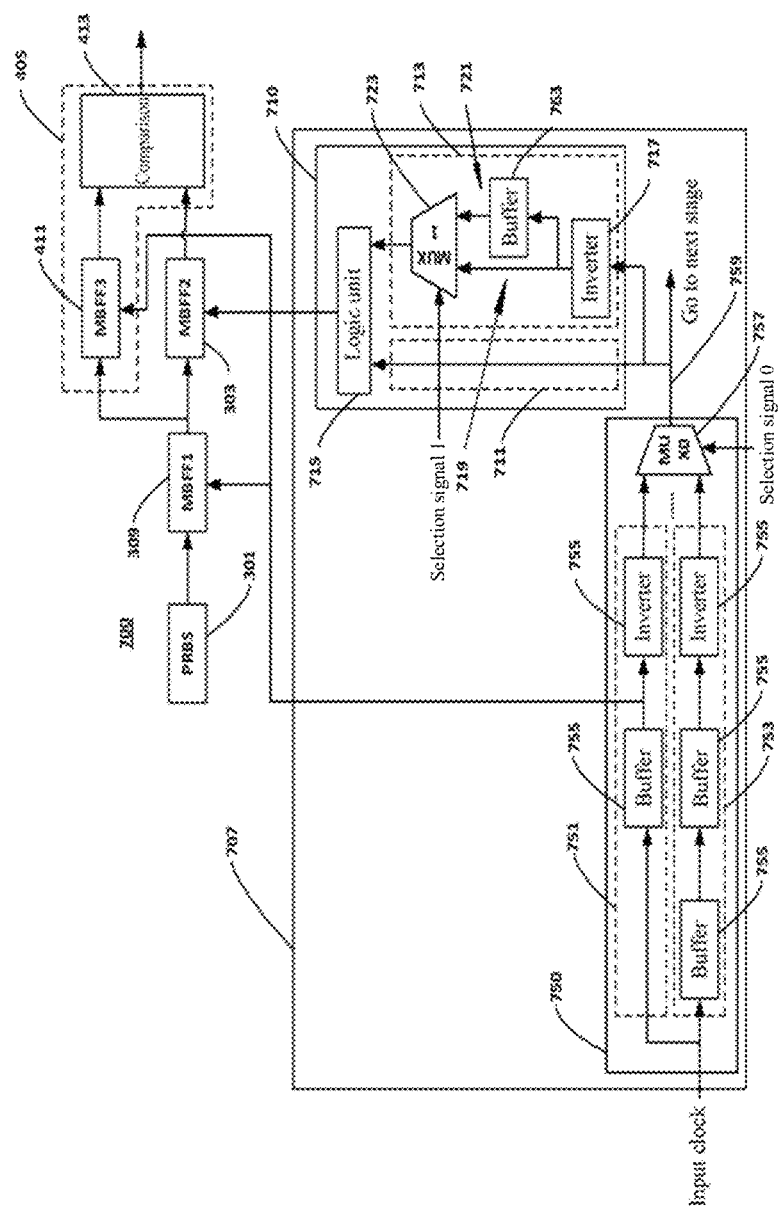
FIG. 7 shows a schematic diagram of a test circuit according to still another embodiment of the present disclosure.

FIG. 7 shows a schematic diagram of a test circuit according to still another embodiment of the present disclosure. A test circuit 700 shown in FIG. 7 is substantially the same as the test circuit previously shown except for a clock driving module 707. In FIG. 7, the same components as those shown in the foregoing accompanying drawings are denoted by the same reference numerals. In addition, the description of the same components is not repeated herein.

The clock driving module 707 for the test circuit 700 is to be described in detail below. Referring to FIG. 7, the clock driving module 707 may include a clock driving circuit (a first clock driving circuit) 710 and a clock driving circuit (a third clock driving circuit) 750.

In some embodiments, the clock driving circuit 710 is configured to adjust a pulse width of the clock signal and provide the clock signal with the adjusted pulse width for the to-be-tested sequential device (for example, the sequential device 303 in the figure). The clock driving circuit 710 may also include the clock driving circuit described in the previous embodiment, and the clock output of the clock driving circuit 750 is used as the clock input of the clock driving circuit instead.

The clock driving circuit 750 may include a plurality of clock paths (which may also be referred to as third clock paths) 751 and 753 and the like, which are configured to provide corresponding clock signals to a selector MUX0 (marked as 757), respectively. The clock paths 751 and 753 are only exemplarily shown in FIG. 7 herein. However, in other embodiments, the clock driving circuit may include more clock paths (third clock paths).

In some embodiments, the clock paths (the third clock paths) may each receive the same input clock, and perform different delays and/or perform phase inversion processing on the input clock to obtain different versions of the clock signal. For example, in some embodiments, the clock paths may each receive the same input clock, and perform various delays and/or perform phase inversion processing on the input clock to obtain different versions of the clock signal. For example, in some embodiments, the clock paths each provide different delays with respect to each other and/or provide inversion to the input clock. In some other embodiments, some clock paths may also provide the same delay or phase inversion. At least part of the clock paths may have a clock adjustment unit 755, for example, a buffer, an inverter, or the like, to adjust properties of the clock signals, such as the phases. As shown in the figure, the clock path 751 has one buffer (assuming that the delay is τ) and an inverter (performing phase inversion), and the clock path 753 has two buffers (assuming that the delays are τ, respectively) and an inverter (performing phase inversion), so as to perform different delays on the input clock, thereby providing a version of clock signal which is inverted and delayed by τ and a version of clock signal which is inverted and delayed by 2τ, respectively. In some cases, a clock path without the adjustment unit 755 may also be provided.

The clock driving circuit 750 may include the selector (which may also be referred to as a third selector) MUX0 757 configured to select a clock signal from the clock signals provided by the plurality of third clock paths for the corresponding to-be-tested sequential device. For example, the selector 757 may select a clock signal from the plurality of third clock paths based on a selection signal (for example, a selection signal 0) to provide the selected clock signal as a clock output 759 to the to-be-tested sequential device or to the next stage.

Under an actual operating condition of the processor, it may be determined through the selection signal (for example, the selection signal 0) which clock signal is used as an output clock, so as to meet the timing requirements of the to-be-tested sequential device, for example, requirements for the hold timing and the minimum clock pulse width of the latch.

As shown in FIG. 7, clocks with different delays on clock paths 751 and 753 reach two input terminals of MUX0. The selection signal 0 may be set according to the requirement to select one of the two clock paths as the clock output to be transferred to the clock driving circuit of the current to-be-tested sequential device and/or the next pipeline stage. Clock phases in two adjacent pipelines may be adjusted separately (each has two (or more) different delays), thereby better meeting the timing requirement of the latch in each to-be-tested sequential device.

In a specific implementation, as shown in FIG. 7, the clock driving circuit 710 may include a plurality of clock paths (which may also be referred to as fourth clock paths) 711, 713, and the like, which are configured to provide clock signals with different phases to a logic unit 715, respectively. In some embodiments, the plurality of fourth clock paths may receive the clock signal 759 from the clock driving circuit 750, and provide clock signals with different phases on each of the fourth clock paths based on the received clock signals to the logic unit 715. The clock driving circuit 710 may further include the logic unit 715. The logic unit 715 may generate a clock signal with an adjusted pulse width for the to-be-tested sequential device 303 based on at least part of the clock signals with different phases. In some specific embodiments, the logic unit 715 may be an AND gate or an OR gate. The present disclosure is not limited thereto.

The plurality of fourth clock paths may include at least a first path and a second path. In the example shown in FIG. 7, the first path 711 may be configured to directly provide the clock input 759 to the logic unit 715. The second path 713 may be configured to provide a further adjusted version (for example, an inverted version or an inverted and delayed version) to the logic unit 715 based on the received clock input 759.

As shown in the figure, the second path 713 may include an inverter 717. The inverter 717 receives the clock input (for example, an input clock or a clock output from an intermediate circuit) 759, and generates a clock signal which is inverted to the clock input 759. The second path 713 may further include one or more sub-paths, for example, sub-paths 719 and 721 shown in the figure. The sub-paths 719 and 721 are configured to provide corresponding versions of the inverted clock signal to a selector (in some cases, the selector may also be referred to as a fourth selector) 723, respectively. For example, in the example shown in FIG. 7, the sub-path 721 delays the inverted clock signal by a buffer to provide a delayed version of the inverted clock signal, and the sub-path 719 provides the inverted clock signal which is not subjected to processing. In this way, an output signal of the inverter reaches two input terminals of the selector MUX1 through two clock transfer paths with different delays.

The selector MUX1 723 is configured to select a version from the different versions of the inverted clock signal and provide the selected version to the logic unit. The MUX1 may select an appropriate clock path latency to meet the requirement for a pulse width of the to-be-tested sequential device (for example, a latch).

In the example shown in FIG. 7, the clock provided to the to-be-tested sequential device may be generated by a logic unit (for example, OR gate or AND gate) from the clock output signal of the clock driving circuit 750 and the inverted clocks of different versions of the clock output signal. Since the to-be-tested sequential device may be located in the corresponding pipeline stage, the pulse width of the clock provided to the to-be-tested sequential device in this stage may be determined by the output signal of the clock driving circuit 750 of this pipeline stage and a phase of the inverted clock of the selected version of the output signal (that is, a delay time of the version of the inverted clock relative to the clock output signal).

The selector MUX1 may select one of two (or more) clock sub-paths as one of inputs of the logic unit 715 according to the selection signal 1, and the other input of the logic unit 715 is the clock output signal of the clock driving circuit of this pipeline stage. In this way, the output signal of the logic unit 715 is used as a clock signal for this pipeline stage (especially the latch device therein), so that the duty cycle width is adjustable.

Figure 8:
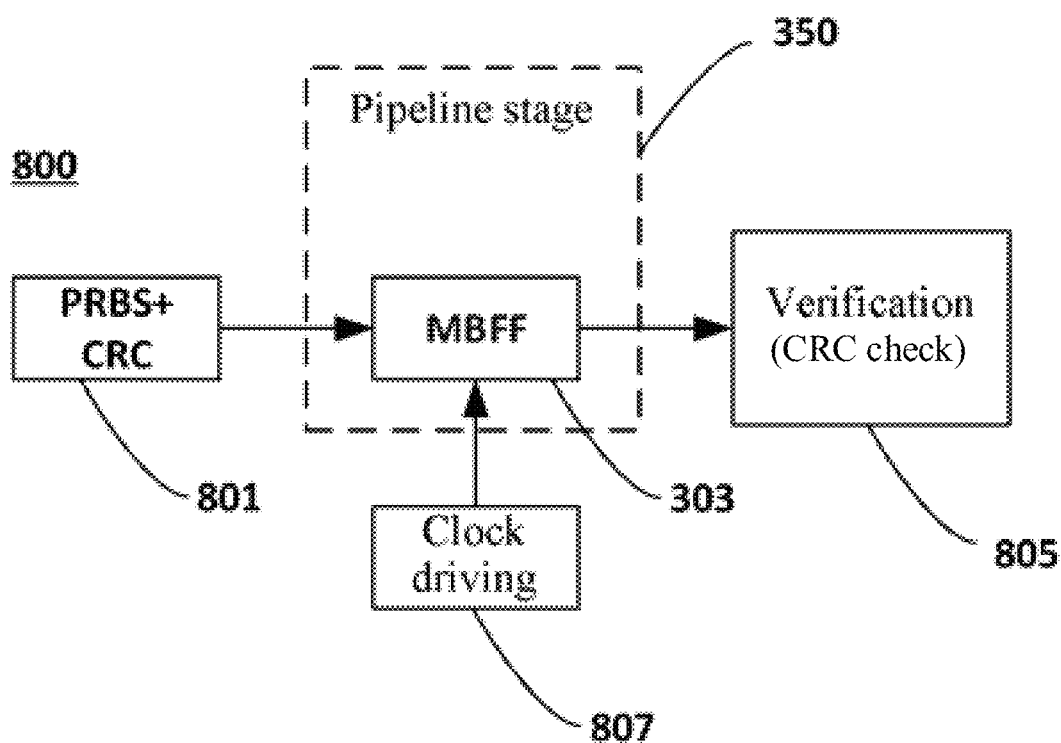
FIG. 8 shows a schematic diagram of a test circuit according to an embodiment of the present disclosure.

FIG. 8 shows a schematic diagram of a test circuit according to an embodiment of the present disclosure. As shown in FIG. 8, a test circuit 800 is configured to test the to-be-tested sequential device 303. The content described above with respect to the same or similar components in other embodiments (for example, to-be-tested sequential devices, and the like) can be equally or adaptively applied to this embodiment, and therefore is not repeated herein.

As shown in FIG. 8, the test circuit 800 includes a test sequence providing module 801 configured to provide a test sequence to the to-be-tested sequential device 303. The test sequence may include, for example, a PRBS or a PRBS including a check code.

The test circuit 800 further includes a clock driving module 807 configured to provide a clock signal to the to-be-tested sequential device. The test circuit 800 further includes a verification module 805 configured to check the output of the to-be-tested sequential device by using the check code.

The content described above with respect to other accompanying drawings may be equally or adaptively applied to the test circuit shown in FIG. 8. Therefore, the details will not be described herein again.

In some embodiments, the processor may have one or more cores. The to-be-tested sequential device, the clock driving circuit, and the like described above may be arranged in the core(s).

It should be further understood that there is further disclosed a computing system, including the test circuit as described in any of the embodiments described or shown herein.

The test circuit, the processor, or the computing system according to the embodiment of the present disclosure may be used for processing or calculation of digital currency. Examples of digital currency may include, for example, Bitcoin, Litecoin, Ethereum, and other digital currency.

According to another aspect of the present disclosure, a test method for a test circuit is further conceived. The test circuit may be the test circuit described in any of the embodiments disclosed herein. The method may include the following steps.

In step (1), clock signals with different configurations are provided to a to-be-tested sequential device by a clock driving module. In step (2), a test sequence is provided to an input of the to-be-tested sequential device. In step (3), it is detected whether an output of the to-be-tested sequential device meets a requirement under the clock signal with each configuration.

In some embodiments, the method may further include the following steps. In step (4), a corresponding clock configuration or clock configuration range that meets the requirement is determined. In step (5), a difference between a predetermined timing parameter range designed for the to-be-tested sequential device and the corresponding clock configuration that is determined to meet the requirement through testing is determined. In step (6), a circuit design of the to-be-tested sequential device and/or process parameters for manufacturing the to-be-tested sequential device are modified according to the difference.

According to the embodiment of the present disclosure, a novel test circuit, computing system, and test method are provided. The test circuit, computing system, and test method according to the present disclosure may be used for processing and calculation of digital currency or virtual currency, and for testing of a circuit or system for digital currency or virtual currency. According to the embodiment of the present disclosure, a flexibly configured clock path is provided, and a plurality of clock options are provided for testing of a pipeline stage. According to the embodiment of the present disclosure, more paths lead to more provided options. According to the embodiment of the present disclosure, clocks with flexible configuration may be provided for all the pipeline stages, thereby greatly improving the flexibility of design and testing of a mining machine processor, and directly or indirectly increasing the product yield.

A person skilled in the art should realize that the boundary between operations (or steps) described in the above embodiments is merely illustrative. A plurality of operations may be combined into a single operation, the single operation may be distributed in an additional operation, and the operations may be performed at least partially overlapping in time. Moreover, alternative embodiments may include a plurality of instances of particular operations, and the operation sequence may be changed in other various embodiments. However, other modifications, changes, and replacements may also exist. Therefore, the specification and accompanying drawings are to be regarded as illustrative rather than restrictive.

Although some particular embodiments of the present disclosure have been described in detail by the examples, a person skilled in the art should understand that the foregoing examples are merely intended to describe rather than limit the scope of the present disclosure. Each embodiment disclosed herein may be combined arbitrarily without departing from the spirit and scope of the present disclosure. A person skilled in the art should also understand that various changes can be made to the embodiments without departing from the scope and spirit of the present disclosure. The scope of the present disclosure is defined by the appended claims.

What is claimed is:

1. A test circuit, comprising:
    a clock driving circuit, configured to provide clock signals with different configurations to a to-be-tested sequential circuit, wherein the clock driving circuit comprises a first clock driving circuit, and the first clock driving circuit comprises:
    a plurality of first clock paths, configured to provide corresponding clock signals, respectively; and
    a logic gate circuit, configured to generate a first clock signal with an adjusted pulse width for the to-be-tested sequential device based on at least part of clock signals provided by the plurality of first clock paths; and
    a verification circuit, configured to verify an output of the to-be-tested sequential circuit under the clock signal with each configuration.

2. The test circuit according to claim 1, wherein the verification circuit comprises:
    a reference sequential circuit, wherein a test sequence is synchronously provided to the reference sequential circuit and the to-be-tested sequential circuit, and the first clock driving circuit further provides a second clock signal to the reference sequential circuit; and
    a comparison module, configured to compare an output of the reference sequential circuit with the output of the to-be-tested sequential circuit.

3. The test circuit according to claim 1, wherein the plurality of first clock paths receive a common clock input and provide clock signals with different phases based on the clock input, respectively.

4. The test circuit according to claim 1, wherein at least one of the first clock paths further comprises:
    a first selector, configured to select a clock signal from clock signals provided by a plurality of sub-paths of the corresponding first clock path and provide the selected clock signal to the logic gate circuit.

5. The test circuit according to claim 1, wherein the clock driving module further comprises a second clock driving circuit, and wherein the second clock driving circuit comprises:
    a plurality of second clock paths, configured to provide clock signals with different phases, respectively, wherein at least one of the plurality of second clock paths provides a clock signal based on the first clock signal; and
    a second selector, configured to select a clock signal from the clock signals provided by the plurality of second clock paths for the to-be-tested sequential device.

6. The test circuit according to claim 1, wherein the clock driving circuit further comprises a third clock driving circuit, and wherein the third clock driving circuit comprises:
    a plurality of third clock paths, configured to provide clock signals with different phases, respectively; and
    a third selector, configured to select a clock signal from the clock signals provided by the plurality of third clock paths for at least one of the plurality of first clock paths.

7. The test circuit according to claim 6, wherein the plurality of first clock paths comprise at least a first path and a second path;
    the first path provides the selected clock signal to the logic gate circuit; and
    the second path provides an inverted version or an inverted and delayed version of the selected clock signal to the logic gate circuit.

8. The test circuit according to claim 7, wherein the second path comprises:
    an inverter, configured to receive the selected clock signal and generate a clock signal which is inverted to the selected clock signal;
    one or more sub-paths, configured to provide corresponding versions of the inverted clock signal to a fourth selector, respectively; and
    the fourth selector, configured to select a version from the different versions of the inverted clock signal and provide the selected version to the logic gate circuit.

9. The test circuit according to claim 8, wherein the one or more sub-paths provide different delayed versions of the inverted clock signal to the fourth selector, respectively.

10. The test circuit according to claim 1, wherein the logic gate circuit is an AND gate or an OR gate.

11. The test circuit according to claim 1, further comprising a check module configured to check the output of the to-be-tested sequential circuit by using a check code in a test sequence provided to the to-be-tested sequential device.

12. The test circuit according to claim 1, wherein the sequential circuit is a flip-flop or a latch.

13. The test circuit according to claim 1, further comprising an additional sequential circuit associated with the to-be-tested sequential circuit.

14. A computing system, comprising the test circuit according to claim 1.

15. A test method for a test circuit for testing sequential circuit in pipeline stage, wherein the test circuit is the test circuit according to claim 1, and
    the method comprises:
    providing clock signals with different configurations to the to-be-tested sequential circuit by the clock driving circuit;
    providing a test sequence to an input of the to-be-tested sequential circuit; and
    detecting whether an output of the to-be-tested sequential circuit meets a requirement under the clock signal with each configuration.

16. The method according to claim 15, further comprising:
    determining a corresponding clock configuration or clock configuration range that meets the requirement;
    determining a difference between a predetermined timing parameter range designed for the to-be-tested sequential circuit and the corresponding clock configuration determined to meet the requirement through testing; and
    modifying, a circuit design of the to-be-tested sequential circuit and/or process parameters for manufacturing the to-be-tested sequential circuit according to the difference.

* * * * *